United States Patent
Savant et al.

(10) Patent No.: US 8,074,534 B2
(45) Date of Patent: Dec. 13, 2011

(54) FLYWHEEL HAVING LUBRICATION-FLOW PASSAGEWAY

(75) Inventors: Satish Savant, Peoria, IL (US); David Fee, Groveland, IL (US); Bradford Kough, Metamora, IL (US); Jonathan Baumann, Peoria, IL (US); Perry Cruce, Marquette Hts., IL (US); Matthew Dames, Brimfield, IL (US)

(73) Assignee: Caterpillar Inc., Peoria (IL)

( * ) Notice: Subject to any disclaimer, the term of this patent is extended or adjusted under 35 U.S.C. 154(b) by 1169 days.

(21) Appl. No.: 11/830,278

(22) Filed: Jul. 30, 2007

(65) Prior Publication Data

US 2009/0036249 A1    Feb. 5, 2009

(51) Int. Cl.
*H02K 7/02* (2006.01)
*F16C 15/00* (2006.01)
*B23Q 11/12* (2006.01)
*F16N 39/00* (2006.01)

(52) U.S. Cl. .................... 74/572.1; 74/572.2; 184/6.14; 184/6.21

(58) Field of Classification Search ................ 74/572.1, 74/573.1, 572.2; 184/6.14, 6.21; 100/282; 72/69; 192/70.12; 123/3
See application file for complete search history.

(56) References Cited

U.S. PATENT DOCUMENTS

| | | | |
|---|---|---|---|
| 2,577,303 A * | 12/1951 | Bohlander | 72/69 |
| 2,593,116 A * | 4/1952 | Danly et al. | 184/6.14 |
| 2,788,877 A | 4/1957 | Richardson | |
| 3,334,529 A | 8/1967 | Cancrinus et al. | |
| 3,425,298 A | 2/1969 | Friedmann et al. | |
| 3,429,400 A | 2/1969 | Engle et al. | |
| 3,449,983 A | 6/1969 | Friedmann et al. | |
| 3,495,298 A | 2/1970 | Engle et al. | |
| 3,897,860 A | 8/1975 | Borck et al. | |
| 3,937,103 A * | 2/1976 | Kleinhans | 74/572.2 |
| 4,069,669 A | 1/1978 | Pitkanen | |
| 4,413,716 A * | 11/1983 | Newsome et al. | 192/70.12 |
| 4,566,572 A * | 1/1986 | Flotow et al. | 192/70.12 |
| 4,928,553 A | 5/1990 | Wagner | |
| 5,086,664 A | 2/1992 | Wagner | |
| 5,185,541 A | 2/1993 | Jensen | |
| 5,628,248 A * | 5/1997 | Oen et al. | 100/282 |
| 6,076,456 A * | 6/2000 | Daniel | 100/282 |
| 2007/0227470 A1* | 10/2007 | Cole et al. | 123/3 |

* cited by examiner

*Primary Examiner* — Vinh T. Luong
(74) *Attorney, Agent, or Firm* — Leydig, Voit & Mayer

(57) ABSTRACT

A flywheel includes a hub portion concentrically defined around a center of the flywheel. A body portion located peripherally around the hub portion has a driver-side face and a driven-side face. A plurality of passageways in the body portion extend through the flywheel and fluidly connect the driver-side face with the driven-side face. Each of the plurality of passageways is adapted to receive a flow of lubricant spilling onto the driver-side of the body portion when the flywheel is rotating, and to expel lubricant out of the driven-side face of the body portion.

2 Claims, 5 Drawing Sheets

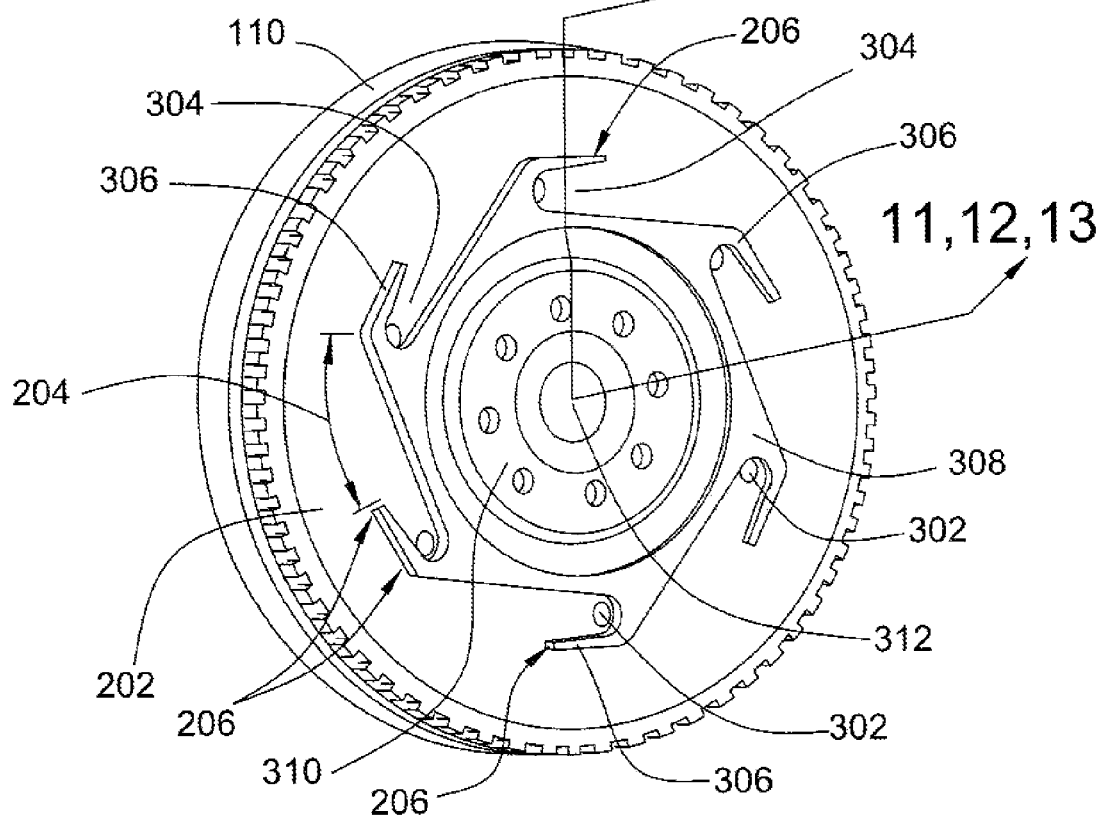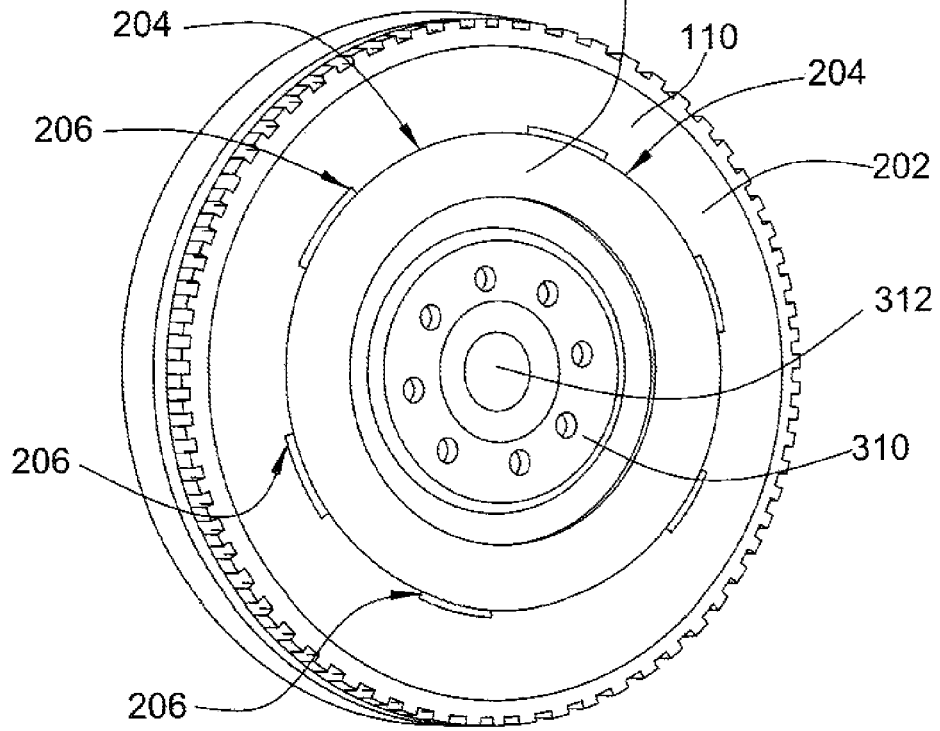

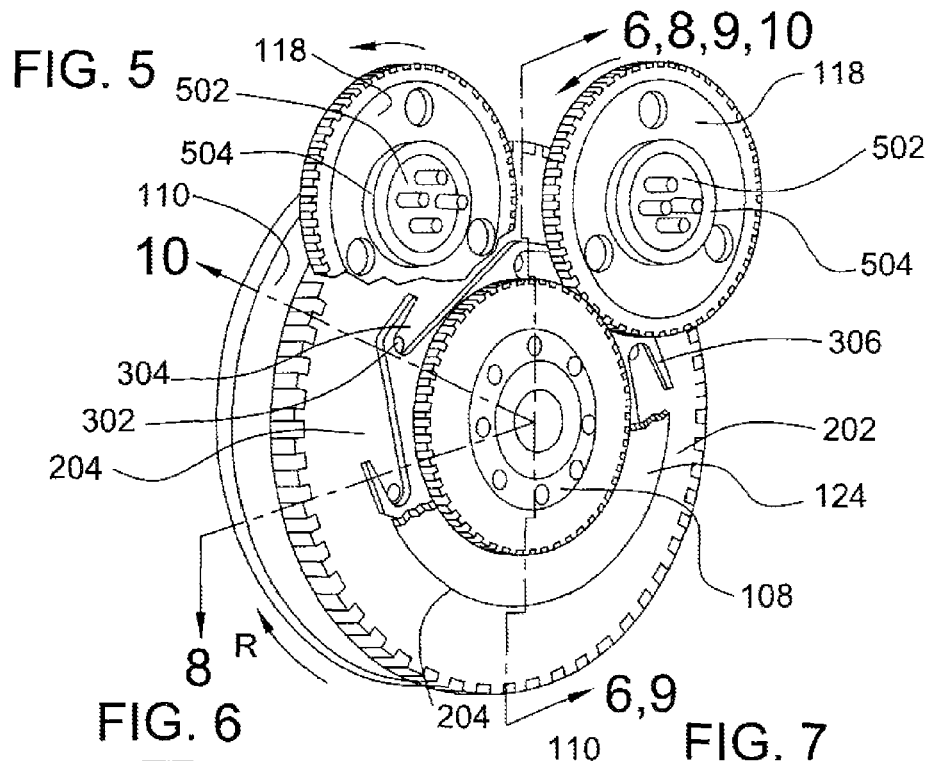
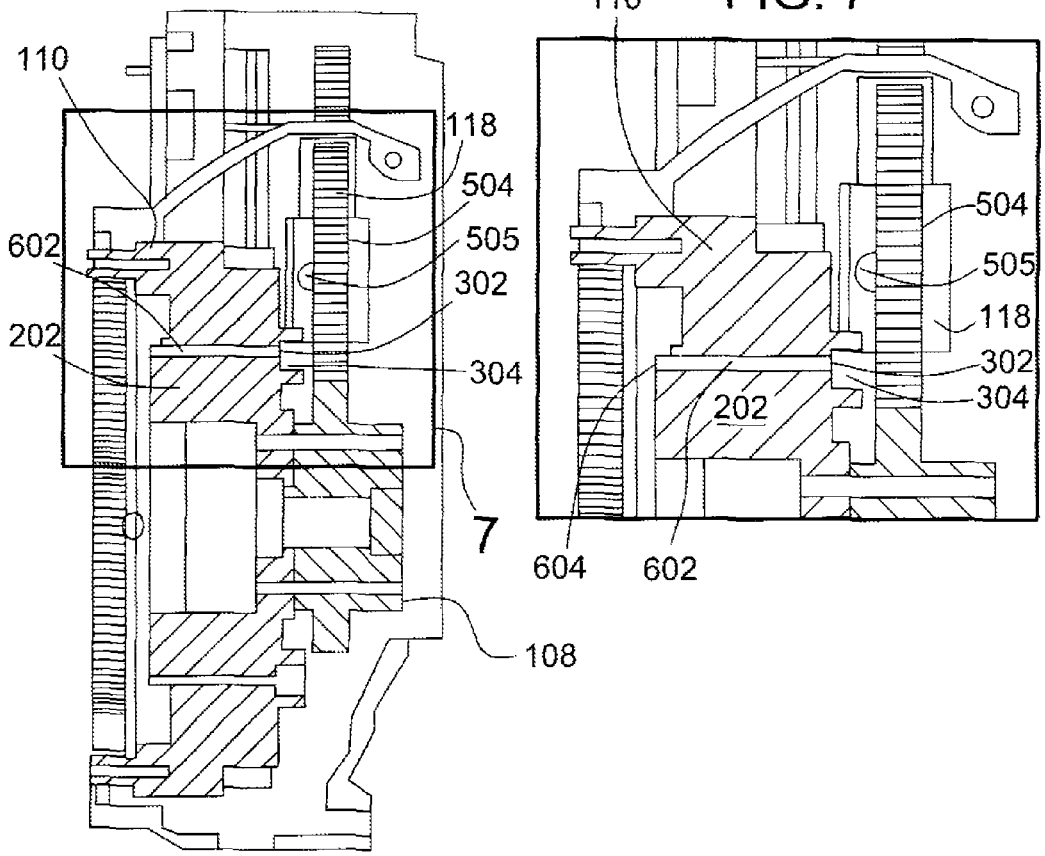

US 8,074,534 B2

FLYWHEEL HAVING LUBRICATION-FLOW PASSAGEWAY

TECHNICAL FIELD

This patent disclosure relates generally to lubrication of components used in systems for transmission of mechanical power, and more particularly to lubrication passageways formed in such components.

BACKGROUND

Systems for transmitting mechanical power that include flywheels and clutches are known. These systems typically include a driver portion that generates power, for example, an internal combustion engine or electric motor, and a driven portion, for example, a vehicle transmission or a generator. Such systems often operate under severe temperature conditions, and individual components included in these systems, such as clutches, may require lubrication that both reduces unwanted friction and provides cooling.

Providing lubrication for clutches has typically been accomplished by incorporating fluid conduits that receive lubricant from the driver portion and which deliver the lubricant to the clutch by extending around other intermediary components, such as flywheels. Even though such designs have proven effective in the past, incorporating fluid conduits into a transmission in this manner can be costly and complex. These fluid conduits are typically made of steel tubing that is bent into a shape that follows a usually narrow and tortuous path connecting a source of lubricant from the driver portion to the clutch.

BRIEF SUMMARY OF THE INVENTION

A flywheel for transferring a flow of lubricant includes a hub portion concentrically defined around a center of the flywheel, and a body portion having a driver-side face and a driven-side face. A plurality of passageways are defined in the body portion that extend through the flywheel and fluidly connect the driver-side face with the driven-side face. Each of the plurality of passageways is configured to receive a portion of a flow of lubricant spilling onto the driver-side of the body portion when the flywheel is rotating, and to expel the lubricant out of the driven-side face of the body portion.

A method of lubricating a clutch located on the driven-side of a flywheel, while the flywheel is rotating, includes the step of providing the flow of lubrication fluid that spills onto a driver-side of the flywheel. A portion of the flow of lubrication is received by at least one of the passageways extending through the flywheel, and expelled on the driven-side of the flywheel to lubricate the clutch.

In one embodiment, a transmission in accordance with the disclosure can include a clutch connected to a driven-system, and a flywheel connected to a driver-system. At least one collector in fluid communication with at least one passageway can be defined in the body portion. An idle gear in contact with a hub gear connected to the flywheel can be configured to receive a flow of lubrication fluid from the driver-system during operation, such that a lubrication path for a flow of lubrication fluid is defined between a rotating interface of the idle gear, the collector, the passageway, and the clutch.

BRIEF DESCRIPTION OF THE DRAWINGS

FIG. 3 is an outline view of a flywheel having lubrication flow features in accordance with the disclosure.

FIG. 4 is an outline view of the flywheel shown in FIG. 3 with a ring flange installed in accordance with the disclosure.

FIG. 5 is a partial cut-away view of a flywheel and several of the surrounding components.

FIG. 6 is a cross-section view of the flywheel shown in FIG. 5 that includes a lubrication flow passageway in accordance with the disclosure.

FIG. 7 is an enlarged view of the cross section of the flywheel illustrated in FIG. 6.

FIG. 9 is a partial cross-section of another alternate embodiment for the flywheel shown in FIG. 5a.

DETAILED DESCRIPTION

This disclosure relates to an apparatus and method of lubricating rotating components in a transmission system. The lubrication arrangement disclosed herein includes at least one collector formed in a rotating flywheel to collect and redirect lubricant to other components. The flow of lubricant is routed from the collector into a passageway extending through the flywheel such that a component, for example a slip-clutch, which is positioned behind the flywheel, may be lubricated.

Figure 1:
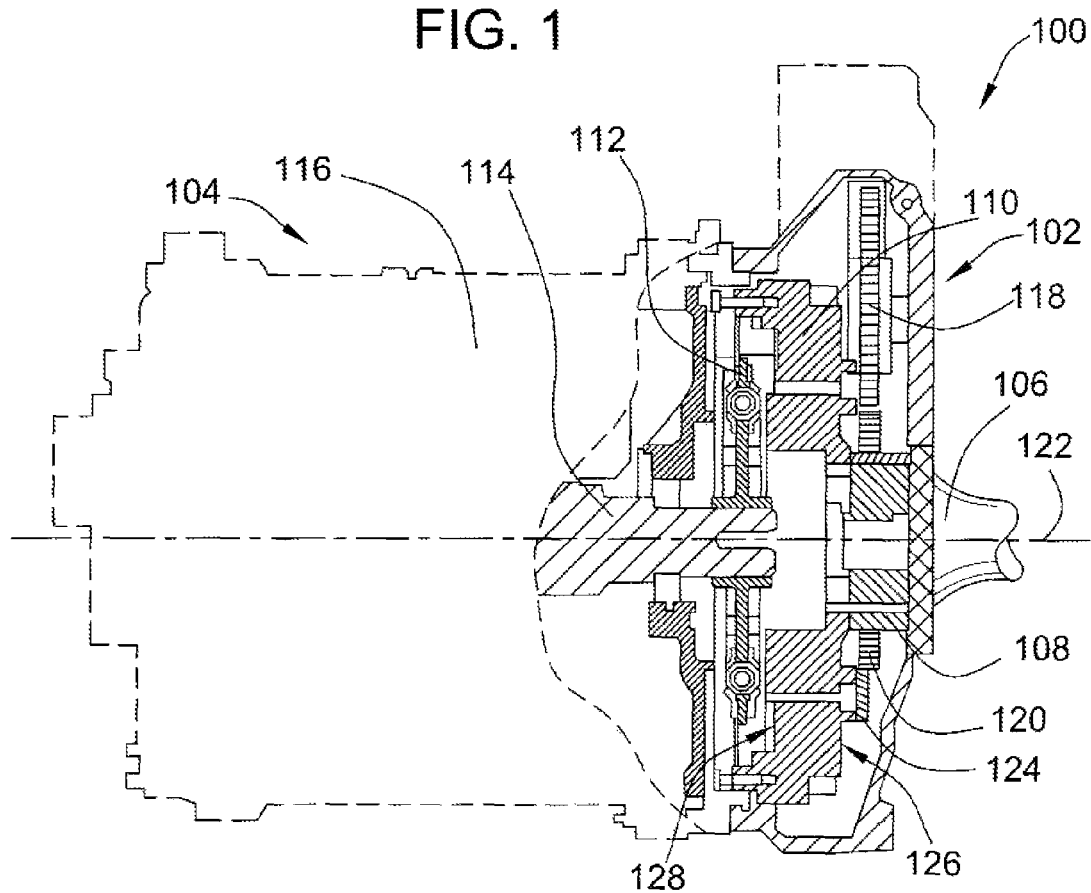
FIG. 1 is a partial cross-section of a transmission system having a flywheel in accordance with the disclosure.

An outline view of one example of a transmission system 100 according to the disclosure is shown in FIG. 1. The transmission system 100 connects a driver system 102 to a driven system 104 such that mechanical power can be transmitted from the driver system 102, through the transmission system 100, to the driven system 104. In the example shown, the driver system is an internal combustion engine (not shown) having a crankshaft 106 connected to a hub gear 108 of the transmission system 100. The hub gear 108 may be connected to a flywheel 110 which can operably cause a clutch 112 to rotate. The clutch 112, in this example, is connected to an armature assembly 114 of a generator 116. The transmission system 100 is capable of driving other components in addition to the driven system 104 by use of idler gears 118 that are meshed with a hub gear portion 120 of the hub gear 108. The flywheel 110 is advantageously symmetrical about a centerline 122 and has a ring-flange 124 connected concentrically on the flywheel 110. The ring-flange 124 is connected on a driver-side 126 of the flywheel 110 that is on an opposite side from the driven side 128 of the flywheel 110. The driven side 128 of the flywheel 110, as shown, is the side facing the clutch 112.

Figure 2:
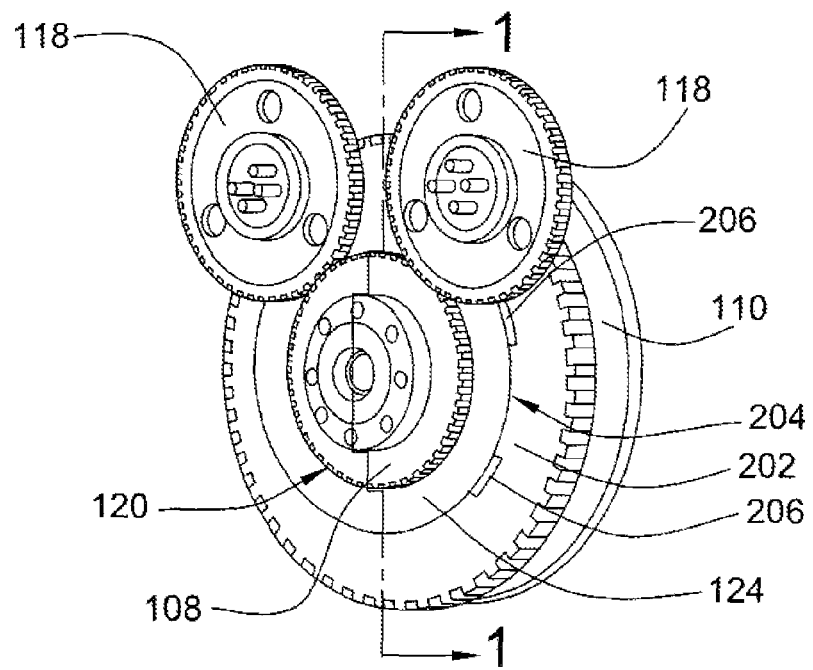
FIG. 2 is an outline view of a spatial relationship between a flywheel and two idler gears in an installed condition, a cross section of which is shown in FIG. 1.

An outline view of the flywheel 110 and the idler gears 118 as installed in the transmission 100 relative to each other, but with other surrounding components removed for clarity, is shown in FIG. 2. The ring-flange 124 is connected to a body portion 202 of the flywheel 110. A series of collector openings 204 are defined between the ring-flange 124 and the body portion 202. Each opening 204 is an arcuately extending area between two adjacent collector posts 206. In general, the space between the body portion 202, the ring-flange 124, and two adjacent collector posts 206, defines each collector opening 204.

An outline view of the flywheel 110 with the ring-flange 124 removed is shown in FIG. 3, and an outline view of the flywheel 110 with the ring-flange 124 installed is shown in FIG. 4. The hub gear 108 has been removed from both illustrations for clarity. The flywheel 110 includes a plurality of passageway openings 302 defined in the body portion 202. Each of the passageway openings 302 is in fluid communication with a respective one of a plurality of collectors 304. Each collector 304 is open to a respective collector opening 204, as described, and extends in a generally tangential direction with respect to the flywheel 110. Each collector 304 fluidly connects each collector's respective collector opening 204 with a respective passageway opening 302.

A series of curved projections 306 are formed on the body portion 202. The projections 306 extend from a peripherally extending flange 308 along the driver-side 126. The peripherally extending flange 308 is located on the body portion 202 and surrounds the hub portion 310 of the flywheel 110. Each projection 306 extends in an outward direction with respect to the center 312 of the flywheel 110, and curves to follow a tangential path that generally forms one side of a respective collector 304. A distal end of each of the projections 306 forms the respective collector post 206. In the exemplary embodiment shown, the ring flange 124 may advantageously be press-fit onto the flywheel 110 over the peripherally extending flange 308 and at least a portion of each of the projections 306 to both enclose and at least partially define each of the collectors 304.

An outline view of the flywheel 110 and a number of surrounding components is shown in FIG. 5. One of the idler gears 118 and the ring flange 124 are partially cut away for illustration. During operation, the flywheel 110 rotates in a direction "R" denoted by the curved arrows. The hub gear 108 connected to the flywheel 110 rotates with the flywheel 110 causing each of the two idler hears 118 to rotate. Each of the idler gears 118 rotates about a respective hub 502 that passes through the center of each gear 118.

A flow of lubrication fluid may be provided to each hub 502 during operation. The flow of lubrication fluid may pass through and lubricate a rotational interface 504 between each idler gear 118 and its respective hub 502, and spill out of each interface 504 through one or more openings 505. The flow of lubrication fluid spilling out of each interface 505 may advantageously be a jet stream of lubricant that wets at least a portion of the flywheel 110. The flow of lubrication fluid may at least partially fall into one or more of the collector openings 204 as the flywheel 110 rotates. The portion of the lubrication flow entering each opening 204 may advantageously be "scooped-up" by each projection 306, enter the respective collector 304, and be routed to the respective passageway opening 302. The flow of lubricant passing through the interface 504 may be continuous or intermittent during operation.

A cross-section of the flywheel 110 and surrounding components is shown in FIG. 6, and a detail view of a region around one of the idler gears 118 is shown in FIG. 7. In the exemplary views shown, a portion of one of the collectors 304 is sectioned through a portion that intersects the respective passageway opening 302. A passageway 602 defined in the body portion 202 of the flywheel 110 extends through the body portion 202 and fluidly connects the collector 304 with an outlet opening 604. While the flywheel 110 is rotating, the portion of the flow of lubricant spilling out of the interface 504 of each of the idler gears 118 enters into or is scooped up by the collector 304. While in the collector 304, the portion of the flow of lubricant is channeled into the passageway 602 through the passageway opening 302. The portion of the flow of lubricant travels through the flywheel 110 along the passageway 602, and exits the flywheel 110 on the driven side 128 through the outlet opening 604. The portion of the flow of lubricant exiting on the driven side 128 can advantageously be used to lubricate other components, such as the clutch 112, without additional lubrication conduits provided external to the flywheel 110.

Figure 8:
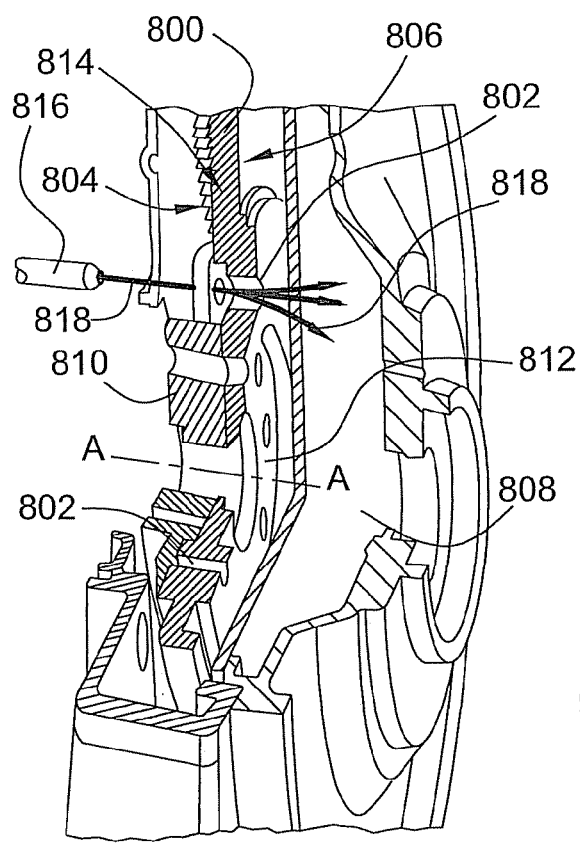
FIG. 8 is a partial three-quarter cross-section of an alternate embodiment for the flywheel shown in FIG. 5, where the cross section has been taken over a ninety degree segment about centerline of the flywheel.

A cross-section view of an alternate embodiment for a flywheel 800 having a lubrication flow passageway 802 extending through the flywheel 800 is shown in FIG. 8. The flywheel 800 has a driver-side 804 connected to, for example, a rotating crankshaft (not shown), and a driven side 806 that operatively drives a clutch, shown generally at 808. A hub gear 810 is connected to the flywheel 800 along a hub portion 812 of the flywheel 800 that surrounds a centerline A-A of the flywheel 800. A body portion 814 of the flywheel 800 may be defined as the portion of the flywheel that surrounds the hub portion 812. The flow passageway 802 can be one of a plurality of flow passageways 802 that are formed in the body portion 814 of the flywheel 800. Each of the plurality of flow passageways 802 may extend entirely through the body portion 814 of the flywheel 800.

Each of the one or more passageways 802 can advantageously provide an intermittent "line of sight" to the clutch 808 while the flywheel 800 rotates during operation, the line of sight originating from a spray-source of lubricant 816 that can be located off the driver-side 804 of the flywheel 800. As it can be appreciated, an intermittent spray of lubricant following a line-of-sight path 818 that passes through the flywheel 800 may be applied to the clutch 808 directly from the spray-source 816. The spray-source 816 may operate to continuously spray lubricant, or may alternatively be arranged to intermittently spray lubricant at times when the line-of-sight path 818 is open to the clutch 808 as the flywheel 800 rotates.

Figure 9:
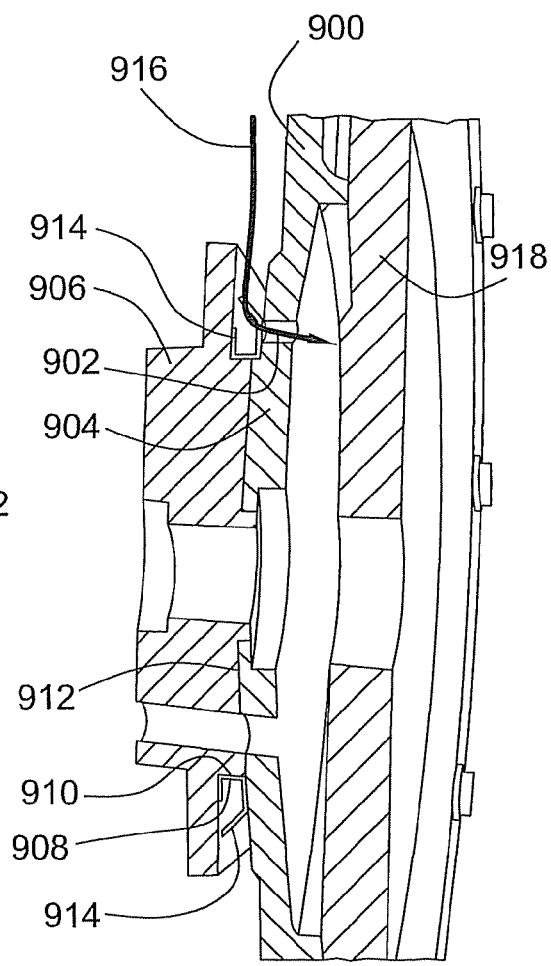

A cross-sectional view of an additional alternate embodiment for a flywheel 900 having a lubrication flow passageway 902 extending through the flywheel 900 is shown in FIG. 9. The passageway 902 may be defined in a body portion 904 of the flywheel 900 and extend through the entire flywheel 900. A hub gear 906 may be concentrically connected to the flywheel 900. A circumferential channel 908 can be defined along a peripheral surface 910 surrounding an interface 912 between the flywheel 900 and the hub gear 906. The circumferential channel 908 can contain a circumferential flow-deflector 914. The circumferential flow-deflector 914 may have a "J" shaped cross section, and may act as a reservoir for lubrication fluid. Additionally, the flow-deflector 914 may deflect a flow of lubricant that enters the channel 908 such that a portion of the flow of lubricant enters the one or more passageways 902.

The flow of lubricant can advantageously pass into the channel 908, be flung-off the deflector 914 while the deflector 914 rotates with the flywheel 900, enter the one or more passageways 902, and be sprayed onto a clutch 918 that may be positioned behind the flywheel 900. In this fashion, the clutch 918 can be lubricated during operation without the addition of specially positioned lubrication passageways that may be routed around the flywheel 900.

Figure 10:
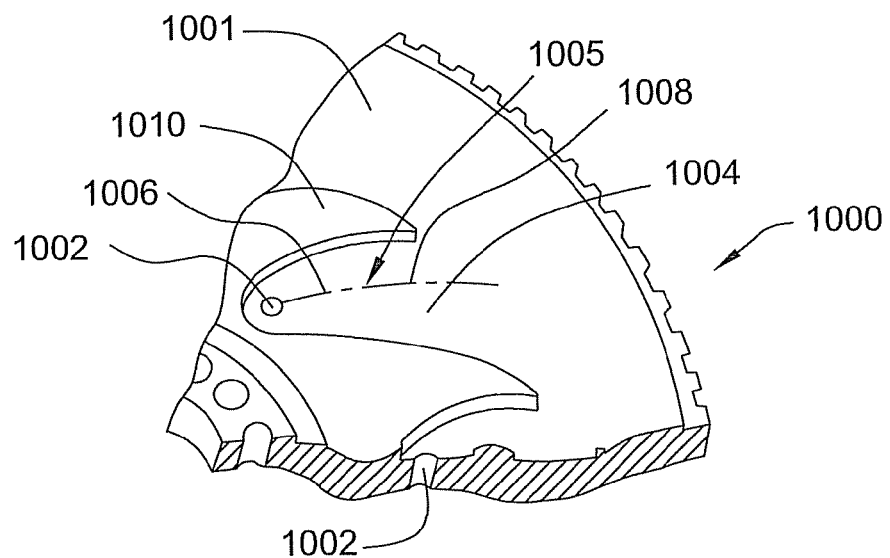
FIG. 10 is a fragmentary view of a segment of an alternate embodiment of the flywheel shown in FIG. 5.

A cross-section of an alternate embodiment for a flywheel 1000 is shown in FIG. 10. The flywheel 1000 has a body portion 1001 that defines a plurality of passageway openings 1002. Each of the passageway openings 1002 is in fluid communication with a respective one of a plurality of collectors 1004. Each collector 1004 extends along a path 1005 that has a radial portion 1006 and a tangential portion 1008 with respect to the flywheel 1000.

In this embodiment, a series of curved projections 1010 are formed in the body portion 1001 and extend in an outward direction, generally following the shape of each collector 1004 along the path 1005. As it can be appreciated, the segment of each collector 1004 disposed around the radial portion 1006 of the path 1005 may collect lubricant during operation of the flywheel 1000 such that there are no interruptions in the supply of lubricant exiting each passageway opening 1002.

Figure 11:
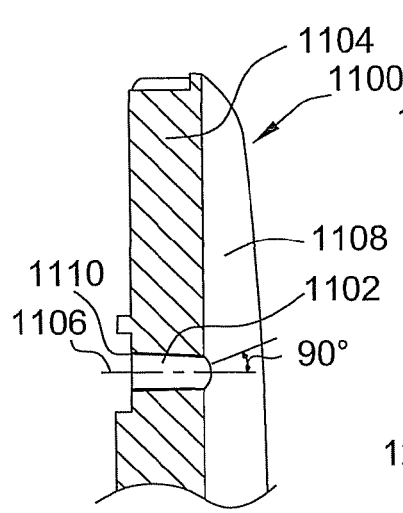
FIG. 11 is partial cross-section of the flywheel shown in FIG. 3

A cross-section of a segment of a flywheel 1100 is shown in FIG. 11. Consistent with the description thus far, the flywheel 1100 forms a passageway 1102 that extends through a body portion 1104 of the flywheel 1100. A centerline 1106 of the passageway 1102 forms a right angle with respect to a driven-side face 1108 of the flywheel 1100. Stated differently, the centerline 1106 of the passageway 1102 is generally parallel to an axis of rotation of the flywheel 1100 during operation. In this configuration, centripetal forces acting upon lubricant found in the passageway 1102 do not accelerate or decelerate the lubricant to an appreciable extent. Lubricant entering a respective collector 1110 displaces lubricant already in the collector 1108, and acts to push lubricant through the passageway 1102.

Figure 12:
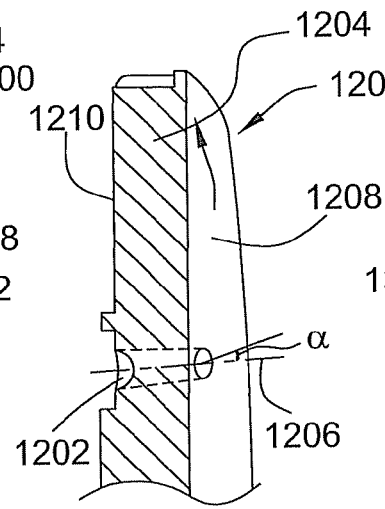
FIG. 12 is a partial cross-section of an alternate embodiment for the flywheel shown in FIG. 3; in this embodiment, the flywheel includes a passageway that is capable of accelerating a flow of lubricant.

A cross-section of a segment of an alternate embodiment for a flywheel 1200 is shown in FIG. 12. In this embodiment, the flywheel 1200 forms a passageway 1202 that extends through a body portion 1204 of the flywheel 1200. A centerline 1206 of the passageway 1202 forms an angle, a, with respect to a driven-side face 1208 of the flywheel 1200. If the centerline 1206 were considered to conscribe a theoretical conic surface during rotation of the flywheel 1200, then the conic surface would have its apex lying on an axis of rotation of the flywheel 1200, the apex located on a driver-side 1210 of the flywheel 1200. Stated differently, the angle α in this embodiment acts to slant the passageway 1202 away from a direction of rotation of the flywheel 1200 such that centripetal forces acting upon lubricant found in the passageway 1202 act to accelerate the flow of lubricant through the passageway 1202 and cast lubricant out of the passageway 1202.

Figure 13:
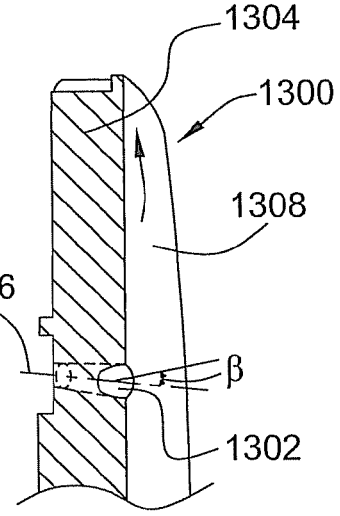
FIG. 13 is partial cross-section of an additional alternate embodiment for the flywheel shown in FIG. 3; in this embodiment, the flywheel includes a passageway that is capable of decelerating a flow of lubricant.

A cross-section of a segment of an alternate embodiment for a flywheel 1300 is shown in FIG. 13. In this embodiment, the flywheel 1300 forms a passageway 1302 that extends through a body portion 1304 of the flywheel 1300. A centerline 1306 of the passageway 1302 forms an angle, β, with respect to a driven-side face 1308 of the flywheel 1300. If the centerline 1306 were considered to conscribe a theoretical conic surface during rotation of the flywheel 1300, then the conscribed conic surface would have its apex lying on an axis of rotation of the flywheel 1300, the apex located on the driven-side 1308 of the flywheel 1300. Stated differently, the angle β in this embodiment acts to slant the passageway 1302 toward a direction of rotation of the flywheel 1300 such that centripetal forces acting upon lubricant found in the passageway 1302 act to decelerate the flow of lubricant in the passageway 1302.

INDUSTRIAL APPLICABILITY

The industrial applicability of the flywheel having at least one lubrication-flow passageway described herein will be readily appreciated from the foregoing discussion. Integration of one or more passageways for permitting a flow of lubricant through the flywheel simplifies existing lubrication arrangements. The embodiments described herein reduce or eliminate the need to provide separate cooling passageways that are routed around the flywheel. A transmission system that includes the flywheel can effectively and efficiently be adequately lubricated during operation by providing a lubrication passageway through the flywheel, and by providing features that induce the flow of lubricant through the lubrication passageway.

In general, a method of lubricating a clutch that is positioned on a driven-side of a rotating includes the step of providing a flow of lubrication fluid spilling onto a driver-side face of the flywheel. At least a portion of the flow of lubrication fluid can be received into a passageway through at least one collector or directly into a passageway that extends through the flywheel. The flow may be induced to move through the passageway, for example by use of a deflector, a spray-source, or a tangentially extending collector that uses centripetal forces to push the lubricant into the passageway. The flow from the passageway can be expelled from a driven-side of the flywheel to lubricate a clutch that may be positioned on the driven-side of the flywheel.

The present disclosure is applicable to any transmission systems utilizing at least one rotating flywheel that operatively causes rotation of a clutch. The embodiments described herein relate generally to a transmission system for transferring power from a driver system, for example an internal combustion engine, to a driven system, for instance a generator. The apparatus and methods described herein for lubricating a clutch can be used in many other different types of applications involving the transfer of power between a driver and a driven system.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A flywheel for transferring a flow of lubricant, comprising:
 a hub portion concentrically defined around a center of the flywheel;

a body portion disposed peripherally around the hub portion, the body portion having a driver-side face and a driven-side face;

a plurality of passageways defined in the body portion, the plurality of passageways extending through the flywheel and fluidly connecting the driver-side face with the driven-side face of the body portion;

a ring-flange concentrically connected to the driver-side face of the body portion; and a plurality of collectors connected to the flywheel, each collector corresponding and being fluidly connected to a respective passageway, wherein the plurality of collectors is defined in the driver-side face of the body portion between:

at least two adjacent projections, each of the at least two projections defined on the driver-side face of the flywheel, each projection extending at least one of radially and tangentially with respect to the flywheel, a surface of the ring-flange, and a surface of the body portion of the flywheel;

wherein each of the plurality of passageways is configured to receive a portion of a flow of lubricant spilling onto the driver-side of the body portion into a corresponding collector when the flywheel is rotating, and to direct the flow of lubricant out of the driven-side face of the body portion.

2. The flywheel of claim 1, wherein each passageway has a respective centerline, each passageway centerline forming an angle with respect to an axis of rotation of the flywheel.

* * * * *

UNITED STATES PATENT AND TRADEMARK OFFICE
CERTIFICATE OF CORRECTION

| | | |
|---|---|---|
| PATENT NO. | : 8,074,534 B2 | Page 1 of 1 |
| APPLICATION NO. | : 11/830278 | |
| DATED | : December 13, 2011 | |
| INVENTOR(S) | : Savant et al. | |

It is certified that error appears in the above-identified patent and that said Letters Patent is hereby corrected as shown below:

In the Specification

Please correct the following as follows:

Column 2, line 20, delete "FIG. 5a." and insert -- FIG. 5. --.

Column 2, line 24, delete "FIG. 3" and insert -- FIG. 3. --.

Column 2, lines 29, delete "is partial" and insert -- is a partial --.

Signed and Sealed this
Fourteenth Day of July, 2015

Michelle K. Lee
*Director of the United States Patent and Trademark Office*